No. 715,157.  
H. L. SCHAFFNER.  
BRAKE.  
(Application filed June 20, 1902.)

(No Model.)

Patented Dec. 2, 1902.

2 Sheets—Sheet 1.

Witnesses:  
Inventor:  
Henry L. Schaffner  
By  
Alexander & Fowell  
Attorneys.

No. 715,157. Patented Dec. 2, 1902.
H. L. SCHAFFNER.
BRAKE.
(Application filed June 20, 1902.)
(No Model.) 2 Sheets—Sheet 2.
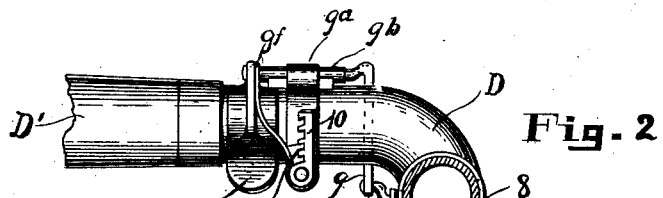
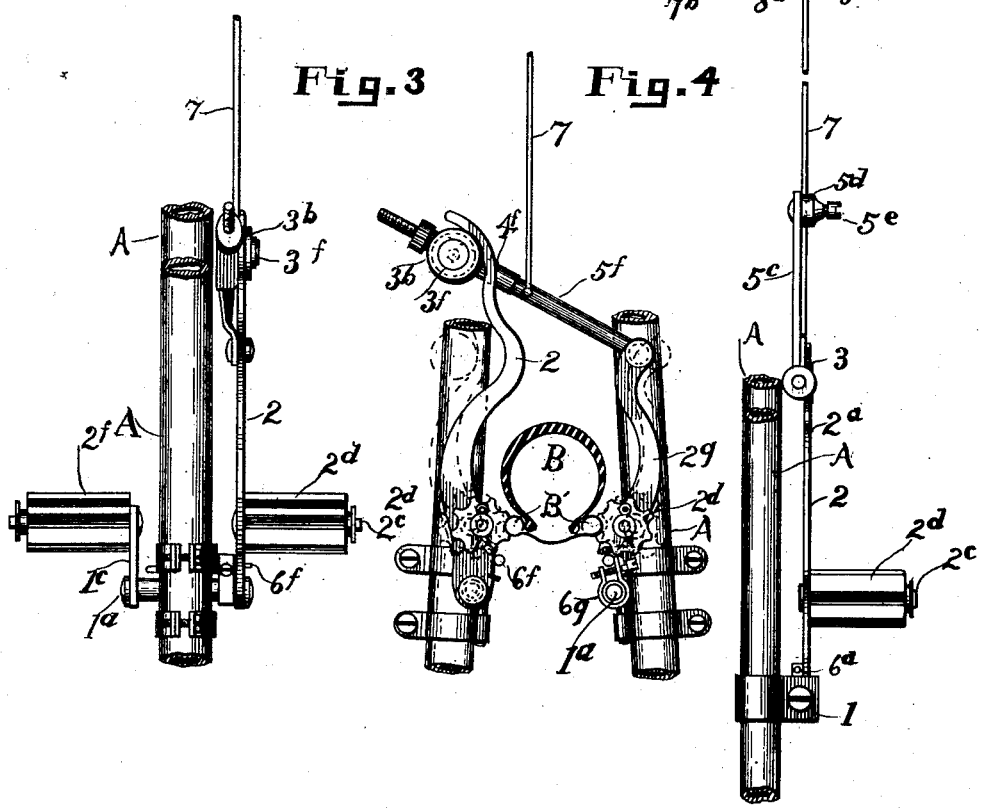
Witnesses:
Inventor:
Henry L. Schaffner
By Alexander & Dowell
Attorneys.

UNITED STATES PATENT OFFICE.

HENRY L. SCHAFFNER, OF FLORENCE, ITALY.

BRAKE.

SPECIFICATION forming part of Letters Patent No. 715,157, dated December 2, 1902.

Application filed June 20, 1902. Serial No. 112,535. (No model.)

*To all whom it may concern:*

Be it known that I, HENRY L. SCHAFFNER, of Florence, Kingdom of Italy, have invented certain new and useful Improvements in Brakes; and I hereby declare that the following is a full, clear, and exact description thereof, reference being had to the accompanying drawings, which form part of this specification.

This invention is an improvement in brakes particularly designed for use on bicycles and motor-cycles; and its object is to produce a powerful quick-acting brake which can be applied by a slight movement of the operating-lever.

Another object is to provide a brake easily attachable to bicycles and the clamping portions of which can be adjusted to a nicety in close proximity to the wheel edges or rim, while being permitted to yield or give in case of a sudden shock or jar or distortion of the wheel when brakes are not applied and can also be readily adjusted to suit any change in position or size of wheel.

Another object is to provide a novel brake-applying device comprising a short thumb-lever partly encircling the handle-bar and arranged thereon in close proximity to the handpiece and adapted to form a comfortable support for the thumb of the rider at all times; also, to provide a brake-lock which can be automatically released by pressure upon the thumb-lever.

The following description explains and the accompanying drawings illustrate the best forms of brake embodying the invention now known to me; but I refer to the claims for concise summaries of the features and combinations constituting the invention and for which I desire protection.

Figure 1:
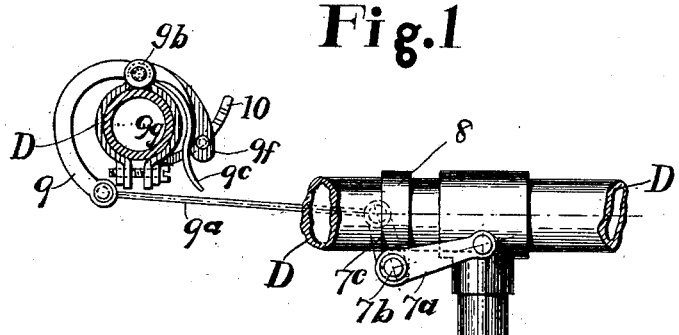
Figure 5:
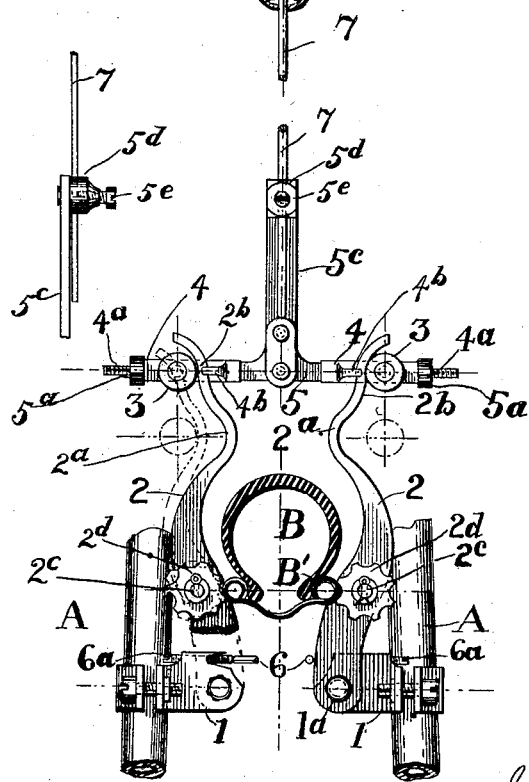

In said drawings, Figure 1 is a front view of the brake complete as applied to a bicycle, the full lines showing the position assumed when brake is applied and the dotted lines the "released" position of parts, only portions of the bicycle and wheel being shown. Fig. 2 is a side view of Fig. 1 partly broken. Fig. 3 is a view of a modified form of brake, and Fig. 4 a side view thereof. Fig. 5 is a detail.

A A designate the opposite legs of the forks of a bicycle, between which the wheel B rotates, and C designates the steering-head, to which is attached the handle-bar D, all of ordinary or other suitable construction, not claimed herein, and simply partially shown in the drawings.

To the legs A, at opposite sides of the wheel B, are secured clamps 1, to which are pivoted the lower ends of opposite brake-levers 2, which extend above the wheel, and their upper ends are provided with the concavo-convex cam bends $2^a$ $2^b$, as shown, for the engagement of rollers 3, which are journaled on pins $4^a$, attached to slides 4, mounted on the opposite ends of a bar 5, having its extremities threaded and provided with adjustable nuts $5^a$, by which the slides 4 can be adjusted toward or from each other, so as to hold the levers 2 in the desired proximity to the wheel. The rollers 3 engage the outer edges of the curved upper ends of the levers 2, and when the bar 5 is lowered, so as to bring the rollers into the concave portions $2^a$ of the levers, the brake will be released, as indicated in dotted lines, Fig. 1. When raised, as shown in full lines, Fig. 1, to engage the convex portion $2^b$ of the levers, the brake is applied. The sleeves 4 may be provided with guide-lugs $4^b$, partly embracing the levers, as shown in Fig. 1, to prevent lateral disengagement of rollers and levers, or the rollers may be flanged, as indicated at $3^b$ in Fig. 4, for this purpose. The levers are normally pressed apart, so as to assume the released position, if permitted, by means of springs 6, which are attached to clamps 1 and are regulable by screws $6^a$, tapped through the clamps, as shown in Fig. 1. Projecting laterally from the levers 2, at points adjacent to the felly B' of the wheel, are pins $2^c$, upon which are longitudinally-fluted friction rollers or shoes $2^d$, which are adapted to engage the felly when the upper ends of the levers are drawn together by the uplifting of bar 5. This bar is provided with an upstanding central arm $5^c$, on the upper end of which is a lug $5^d$, through which passes a rod 7, the rod being adjustably secured to the lug by a screw $5^e$. The rod 7 extends up to an arm $7^a$ on one end of a rock-shaft $7^b$, which is journaled in a tubular bolt $8^a$, provided with a nut $8^b$ and securing a clamp 8 on the handle-bar. On the other end of shaft $7^b$ is an arm $7^c$ at right angles to arm 7ª and connected by a link-rod 9ª to a bent brake-actuating lever 9, journaled in a sleeve 9ᵇ, secured to the handle-bar adjacent to the handpiece D'. To the end of lever 9 next the handpiece is attached a thumb-piece 9ᶜ, which lies in convenient position to support comfortably the thumb of the rider whose hand grasps piece D'. It will be observed that the lever 9 is so shaped that it rocks transversely upon the handle-bar; but as it is located thereon near the handpiece it lies practically at right angles to rod 7ᵇ, and by pressing on piece 9ᶜ the rod 7 will be pulled upward and the brake applied.

Attached to the clamp 9ᵈ, securing sleeve 9ᵇ to the handle-bar, is a short ratchet-bar 10, and attached to the thumb-piece 9ᶜ is a spring-arm 9ᶠ, which carries a tooth 9ᵍ, adapted to be thrown into engagement with the teeth of ratchet 10 by slightly displacing the spring 9ᶠ laterally with the thumb when pressing on lever 9ᶜ. Thus the brake can be readily applied and locked while applied, if desired, and when it is desired to release the brake a slight additional pressure on lever 9ᶜ will permit spring 9ᶠ to disengage its tooth from the rack-bar. The spring, it will be understood, normally holds the tooth out of (not in) engagement with the rack-bar.

The bolts 1ª, upon which the levers 2 are supported, may extend through and be journaled in the clamps, as indicated in Figs. 3 and 4, and rock with the levers, and on the ends of these bolts opposite the levers are attached short arms 1ᶜ, on which are mounted brake-shoes 2ᶠ, similar to shoes 2ᵈ, both front and rear shoes being operated by the action of the levers 2, as is obvious.

As shown in Fig. 4, the springs 6ᶠ are attached to clamps 6ᵍ, adjustably secured to the sleeves, in which bolts 1ª are journaled, and in this figure the clamps are double.

In some cases instead of using two cam-ended levers and double rollers one lever 2ᵍ may be shortened, and in place of bar 5 a bar 5ᶠ may be pivoted to the shorter lever and extend toward the cam end of the opposite lever 2, (see Figs. 3 and 4,) its free end being provided with a sleeve 4ᶠ and roller 3ᶠ, engaging the cam-lever, as shown. The bar 5ᶠ is connected to the rod 7 so as to be raised and lowered thereby, and the effect being when the bar is raised to apply the levers and to release them when the bar is lowered, as in the first instance. The construction shown in Figs. 3 and 4 is well adapted for the rear wheels of bicycles when chain is in the way, and the amount of compression or clamping exerted by the levers is regulable by simply adjusting the rollers inward or outward on the bar by means of nuts 5ª.

The clamps permit the parts to be readily applied to various forms and makes of bicycles and like vehicles, but, if desired, the brakes can be permanently attached to any machine where it is desired to use them by providing suitable supports therefor.

The invention being once disclosed it can be easily embodied in various forms and designs within the scope of my invention. Therefore I do not wish to restrict myself to the specific forms thereof herein shown and described; but

What I claim, and desire to protect by Letters Patent, is—

1. In combination, a wheel, a brake-lever pivoted beside the rim thereof and having a shoe adapted to engage the side rim of the wheel, and having a cam portion on its upper end, a movable bar adjacent to the upper end of the lever, and a roller on said bar engaging the cam portion of the lever substantially as described.

2. In combination, a wheel, a brake-lever pivoted beside the rim thereof, and having a cam-curved upper end, a shoe attached to the lever adapted to engage the side rim of the wheel, a movable bar adjacent to the upper end of the lever, and an adjustable roller on said bar adapted to engage the cam-surface of the lever, for the purpose and substantially as described.

3. In combination, a wheel, a brake-lever pivoted beside the wheel having a curved upper end projecting beyond the wheel, and a spring for throwing the lever from the wheel; with a movable bar adjacent to the upper end of the lever, a sleeve on the bar, a cam-roller on said bar engaging the cam portion of the lever, and means for adjusting the roller on the bar, substantially as described.

4. In combination, a wheel, a brake-lever pivoted beside the wheel having a curved upper end projecting beyond the wheel, a laterally-projecting brake-shoe attached to the lever and adapted to engage the rim of the wheel when the lever is moved inward; with a movable bar adjacent to the upper end of the lever, a sleeve on the bar, a cam-roller on said sleeve engaging the cam portion of the lever, and means for shifting said sleeve on the bar, substantially as described.

5. In a brake, the combination of levers pivoted on opposite sides of the wheel and provided with devices adapted to engage the opposite sides of the felly or rim of the latter, a bar between the upper ends of said levers, and a roller on said bar engaging a lever whereby when the bar is raised the upper ends of levers are drawn together, substantially as described.

6. In a brake, the combination of opposite levers pivoted on opposite sides of the wheel and provided with shoes adapted to engage the opposite sides of the felly or rim of the latter, a bar extending between the upper ends of said levers, a roller-and-cam connection between said bar and levers whereby when the bar is raised the upper ends of levers are drawn together, and springs for separating the levers when the bar is depressed, substantially as described.

7. In a brake, the combination of two levers disposed on opposite sides of the wheel and having their upper ends bent to form cams; with a laterally-movable bar beside the upper ends of the levers, cam-rollers on said bar engaging the cam portions of said levers, and means for moving said bar, substantially as described.

8. In a brake, the combination of two opposite levers disposed on opposite sides of the wheel and having their upper ends bent to form cams, brake-shoes on said levers adapted to engage the rim of wheel, and springs for throwing the levers apart; with a laterally-movable bar beside the upper ends of the levers, sleeves adjustably secured to the ends of said bar, and cam-rollers on said sleeves engaging the cam portions of said levers, substantially as described.

9. In a bicycle-brake, the combination of the braking devices, an actuating-lever pivoted on the handle-bar, the curved thumb-piece connected to said actuating-lever, the rack-bar beside the thumb-piece, the spring-catch attached to the thumb-piece adapted to be thrown into engagement with the rack-bar, and connections between the said actuating-lever and the braking devices, substantially as described.

10. In a bicycle-brake, the combination of the braking devices, the rock-shaft journaled on the handle-bar, arms attached to opposite ends of said shaft, the connection between one of said arms and the braking devices, a link connected to the other arm, an actuating-lever pivoted on the handle-bar beside the handpiece and connected to said link, and the thumb-piece attached to said actuating-lever, substantially as described.

11. In a bicycle-brake, the combination of the braking devices, the rock-shaft journaled on the handle-bar, the arms attached to opposite ends of said shaft, a connection between one of said arms and the braking devices, a link connected to the other arm, an actuating-lever pivoted on the handle beside the handpiece and connected to said link, the thumb-piece attached to said actuating-lever, a ratchet beside the thumb-piece, and the spring-catch on said thumb-piece adapted to be engaged with said ratchet, substantially as described.

12. The combination in a brake, of opposite levers having their upper ends bent to form cam portions, and pivoted at their lower ends on opposite sides of a wheel, and brake-shoes on said levers adapted to engage the rim of wheel; with a movable rod, rollers adjustably secured on the ends of said rod and engaging the cam portions of the opposite levers, and means for moving said rod, substantially as described.

13. The combination in a brake, of opposite levers having their upper ends bent to form cam portions, and pivoted at their lower ends on opposite sides of a wheel, brake-shoes on said levers adapted to engage the rim of wheel, and springs for throwing said levers apart; with a horizontally-disposed vertically-movable rod, sleeves adjustably secured on the ends of said rod, rollers attached to said sleeves engaging the cam portions of the opposite levers, means for moving said rod, and means for adjusting the sleeves on the rod, substantially as described.

14. In a bicycle-brake, the combination with the wheel, a lever, a rock-shaft or bolt beside the rim of the wheel and connected to and rocking with said lever, an arm on the bolt opposite the lever, and opposite brake-shoes respectively attached to said arm and said lever and adapted to engage the same side of the wheel-rim, substantially as described.

In testimony that I claim the foregoing as my own I affix my signature in presence of two witnesses.

HENRY L. SCHAFFNER.

Witnesses:
SPIRITO LEMAN,
HOWARD J. MARTIN.